(12) United States Patent
Chung et al.

(10) Patent No.: US 10,873,908 B2
(45) Date of Patent: Dec. 22, 2020

(54) IOT DEVICE HAVING LOW POWER CONSUMPTION MODE AND OPERATING METHOD THEREOF

(71) Applicant: FCI INC, Bundang-gu (KR)

(72) Inventors: Sang Hak Chung, Bundang-gu (KR); Sang Joon Lee, Bundang-gu (KR); Dong Woo Jang, Bundang-gu (KR)

(73) Assignee: Dialog Semiconductor Korea Inc., Seoul (KR)

( * ) Notice: Subject to any disclaimer, the term of this patent is extended or adjusted under 35 U.S.C. 154(b) by 20 days.

(21) Appl. No.: 15/985,728

(22) Filed: May 22, 2018

(65) Prior Publication Data

US 2018/0338285 A1    Nov. 22, 2018

(30) Foreign Application Priority Data

May 22, 2017 (KR) .................. 10-2017-0062724

(51) Int. Cl.
| H04W 52/02 | (2009.01) |
| H04W 40/24 | (2009.01) |
| H04W 40/00 | (2009.01) |
| H04W 4/70 | (2018.01) |
| H04W 88/06 | (2009.01) |
| H04W 76/10 | (2018.01) |

(52) U.S. Cl.
CPC ....... *H04W 52/0225* (2013.01); *H04W 40/24* (2013.01); *H04W 4/70* (2018.02); *H04W 40/005* (2013.01); *H04W 76/10* (2018.02); *H04W 88/06* (2013.01)

(58) Field of Classification Search
None
See application file for complete search history.

(56) References Cited

U.S. PATENT DOCUMENTS

| 2014/0143408 | A1 | 5/2014 | Workman et al. |
| 2014/0177498 | A1 | 6/2014 | Park |
| 2016/0007288 | A1 | 1/2016 | Samardzija |
| 2017/0353981 | A1* | 12/2017 | Lee ............... H04W 12/08 |
| 2018/0109308 | A1* | 4/2018 | Leroux ............ H04B 7/14 |
| 2018/0176079 | A1 | 6/2018 | Teo et al. |
| 2018/0254920 | A1* | 9/2018 | Shaw ............ H04L 29/06 |
| 2019/0223257 | A1* | 7/2019 | Han ............. H04W 28/02 |

FOREIGN PATENT DOCUMENTS

| CN | 102612124 A | 7/2012 |
| CN | 15323824 A | 2/2016 |
| WO | 20160192387 A1 | 12/2016 |

OTHER PUBLICATIONS

Chinese Office Action, Application No. 201810288230.0, Applicant: Dialog Semiconductor Korea Inc., dated Sep. 1, 2020, 9 pages.

* cited by examiner

*Primary Examiner* — Jutai Kao
(74) *Attorney, Agent, or Firm* — Saile Ackerman LLC; Stephen B. Ackerman (57) ABSTRACT

An IoT device having a low power consumption mode and an operating method thereof are disclosed. An objective in accordance with an aspect of an embodiment is to provide an IoT device wirelessly communicating, without a gateway, with a terminal by only a repeater and an operating method thereof.

12 Claims, 7 Drawing Sheets

IOT DEVICE HAVING LOW POWER CONSUMPTION MODE AND OPERATING METHOD THEREOF

BACKGROUND

Field

The present disclosure relates to an IoT (Internet of Things) device and an operating method thereof, and more particularly to an IoT device and an operating method thereof capable of directly and smoothly communicating, without using a gateway, with a repeater in low power consumption.

Background

The following content only provides background information related to embodiments of the present disclosure, and thus it does not constitute the prior art.

Figure 1:
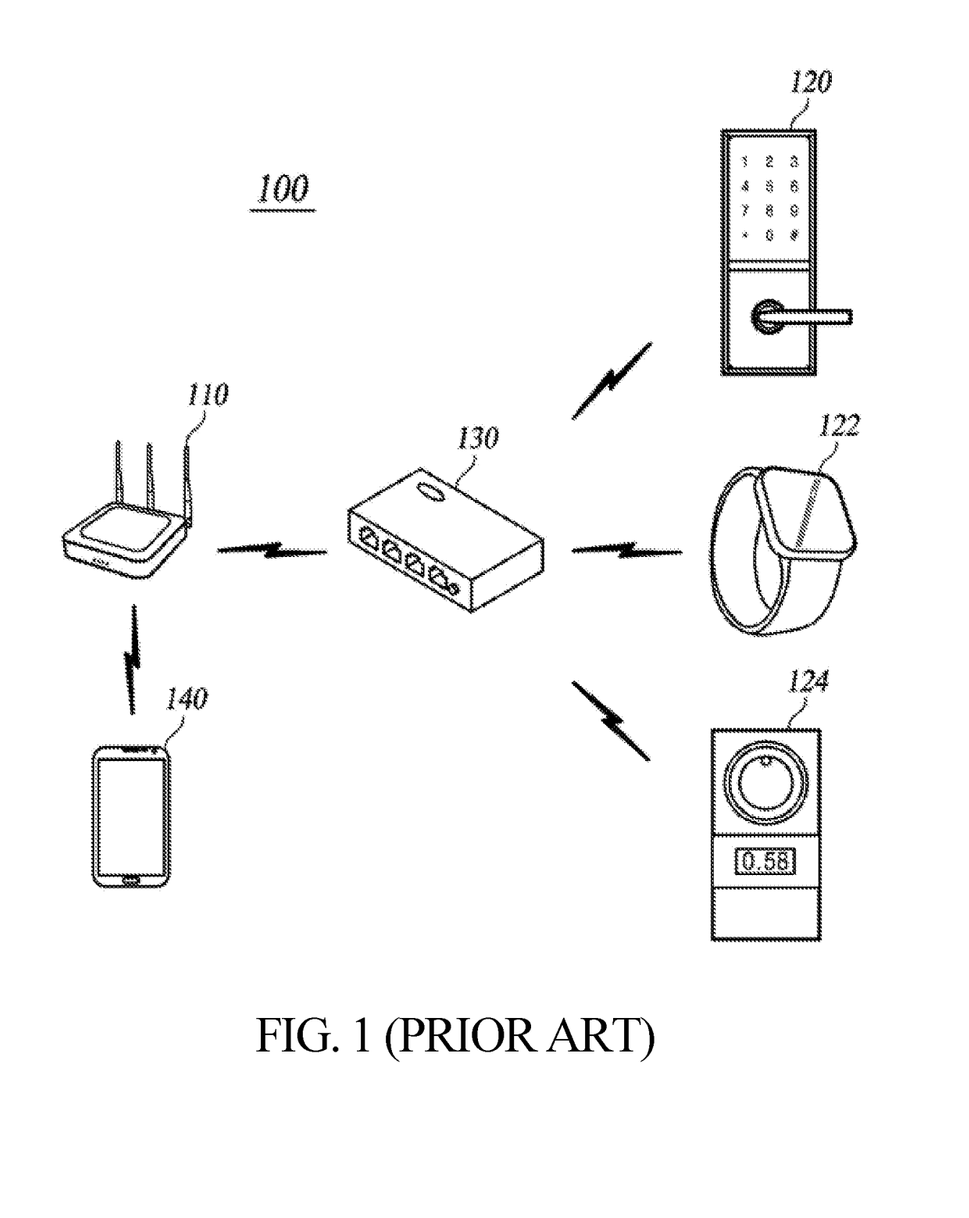
FIG. 1 illustrates a conventional IoT system.

FIG. 1 illustrates a conventional IoT system 100.

The conventional IoT system 100 includes a repeater 110, IoT devices 120, 122, and 124, a gateway 130, and a terminal 140.

The repeater 110 is a device configured to link the IoT devices 120, 122, and 124 to the terminal 140 via a wireless communication, so that data and at least one control signal are received and transmitted between the IoT devices 120, 122, and 124 and the terminal 140. The repeater 110 is configured to link the IoT devices 120, 122, and 124 to the terminal 140. As such, the IoT devices 120, 122, and 124 transmit respective state information to the terminal 140, or the terminal 140 transmits a control signal to the IoT devices 120, 122, and 124 for performing a specific operation.

The repeater 110 may be implemented as various structures according to a type of a wireless network. For example, when the wireless network is WI-FI, the repeater 110 is implemented as an access point (AP). However, the repeater 110 is not limited thereto. As mentioned above, the repeater 110 may be implemented as any one device capable of linking the IoT devices 120, 122, and 124 to the terminal 140 via a wireless network, so that the IoT devices 120, 122, and 124 can use the wireless network. In the following description, the wireless network is WI-FI, and the repeater 110 is an AP.

Each of the IoT devices 120, 122, and 124 refers to a device which transmits information relating to a current state of itself to the terminal 140 via the repeater 110, or receives a control signal from the terminal 140 and is operated according to the control signal. For example, assume that the IoT device 120 is a door lock. The IoT device 120 transmits a current state indicating a locked state or an unlocked state to the terminal 140 via the repeater 110. The IoT device 120 receives a locked control signal or an unlocked control signal form the terminal 140 and is operated, according to the locked control signal or the unlocked control signal, to be locked or unlocked. Herein, each of the IoT devices 120, 122, and 124 is a device assembled with a small-sized battery. Each of the IoT devices 120, 122, and 124 is different from a smart appliance assembled with a permanent power supply and different from a car assembled with a large-sized battery. Accordingly, the IoT devices 120, 122, and 124 are sensitive to a problem of power consumption and need to minimize the power consumption.

The gateway 130 is configured to mediate the link between the repeater 110 and the IoT devices 120, 122, and 124. Assume that the repeater 110 is an AP of WIFI. In a connecting process of accessing to the repeater 110 and in a process of transmitting and receiving data or at least one control signal, the power consumption is highly generated by the IoT devices 120, 122, and 124. To prevent the problem, the gateway 130 communicates with the repeater 110 via WIFI protocol, and the gateway 130 communicates with the IoT devices 120, 122, and 124 by converting WIFI protocol into ZigBee protocol or Z-Wave protocol having low power consumption. Alternatively, the gateway 130 does not convert WIFI protocol, and the gateway 130 communicates with the IoT devices 120, 122, and 124 via WIFI protocol. In order to decrease the power consumption of the IoT devices 120, 122, and 124, the gateway 130 and the repeater 110 perform the necessary process in advance to transmit and receive data, such as searching, authentication, and connection. Only necessary data and at least one control signal are transmitted to or received from the IoT devices 120, 122, and 124 via the WIFI protocol. As such, the gateway 130 can control the IoT devices 120, 122, and 124 to minimize the power consumption.

The terminal 140 is linked to the IoT devices 120, 122, and 124 by the repeater 110, receives the state information from the IoT devices 120, 122, and 124, and transmits the at least one control signal to the IoT devices 120, 122, and 124.

As such, besides the repeater 110, it is not convenient because the conventional IoT system 100 has to include the gateway 130 to minimize the power consumption of the IoT devices 120, 122, and 124.

SUMMARY OF THE INVENTION

An objective of the present embodiments is to provide an IoT device wirelessly communicating, without using a gateway, with a terminal by only a repeater and an operating method thereof.

Moreover, another objective of the present embodiments is to provide an IoT device wirelessly connecting and communicating with a repeater in minimizing power consumption and an operating method thereof.

An aspect of the present embodiments is to provide an IoT device having low power consumption which is directly connected to a repeater without using a gate way and wirelessly communicates with a terminal. The IoT device having low power consumption includes a control part configured to operate in a repeater mode in a situation that a preset condition is satisfied, configured to operate in a terminal mode and try to access to the repeater corresponding to repeater information in a situation that a mode change signal and the repeater information are received in a preset time, and configured to operate in a sleep mode in a situation that the mode change signal and the repeater information are not received in the preset time, wherein beacons are transmitted in the repeater mode, and at least a part of the IoT device is not provided with power in the sleep mode; a wireless communication part configured to transmit, according to control of the control part, the beacons or a signal for accessing to the repeater corresponding to the repeater information, or configured to receive the mode change signal or the repeater information from the terminal; and a power supply part configured to provide the power using a battery.

Another aspect of the present embodiments is to provide an operating method of an IoT device having low power consumption which is directly connected to a repeater without a gate way and wirelessly communicates with the terminal. The operating method of the IoT device having low power consumption includes the following processes: in a transmitting process, operating in a repeater mode in a situation that a preset condition is satisfied, wherein beacons are transmitted in the repeater mode; in a determining process, determining whether a mode change signal and a repeater information are received in a preset time; in an accessing process, operating in a terminal mode to try to access to the repeater corresponding to repeater information in a situation that the mode change signal and the repeater information are received in the preset time; and in a turning-off process, operating in a sleep mode to in a situation that the mode change signal and the repeater information are not received in the preset time, wherein in the sleep mode, at least a part of the IoT device is not provided with power.

Yet another aspect of the present embodiments is to provide a control device of an IoT device having low power consumption which controls, without using a gate way, the IoT device directly connected to a repeater. The control device of the IoT device having low power consumption includes a wireless communication part configured to receive beacons released by the IoT device or configured to transmit a mode change signal and repeater information; a control part configured to control the wireless communication part to transmit the mode change signal and the repeater information, wherein the mode change signal is configured to change an operating mode of the IoT device from a repeater mode in which the beacons are released to a terminal mode, and the repeater information is configured to try to access to the repeater when the operating mode of the IoT device is changed from the repeater mode to the terminal mode; and an input part configured to receive the repeater information from outside.

Yet another aspect of the present embodiments is to provide a control method of an IoT device having low power consumption which controls, without using a gate way, the IoT device directly connected to a repeater. The control method of the IoT device having low power consumption includes receiving beacons released by the IoT device; generating a mode change signal in a situation that the beacons are received, wherein the mode change signal is configured to change an operating mode of the IoT device from a repeater mode in which the beacons are released to a terminal mode; receiving repeater information when the operating mode of the IoT device is changed from the repeater mode to the terminal mode, wherein the repeater information is configured to try to access to the repeater; and transmitting the mode change signal and the repeater information to the IoT device.

DETAILED DESCRIPTION OF ILLUSTRATED EMBODIMENTS

The embodiments of the present disclosure will be described in details in conjunction with the appending drawings. Constituent elements in the drawings are labeled by numerals. For the same constituent element, the same numeral is used as far as possible even if the constituent element is shown in different drawings. In the following description of the present disclosure, a detailed description of known functions and configurations incorporated herein will be omitted when it may make the subject matter of the present disclosure unclear.

Moreover, throughout the description, the terms "comprising", "including", "having", and the like are intended to be inclusive and mean that there may be additional elements other than the listed elements, unless specifically stated otherwise. The terms "part" and "module" described in the description mean a unit for performing at least one function or operation and may be implemented in hardware or software or as a combination of hardware and software.

Figure 2:
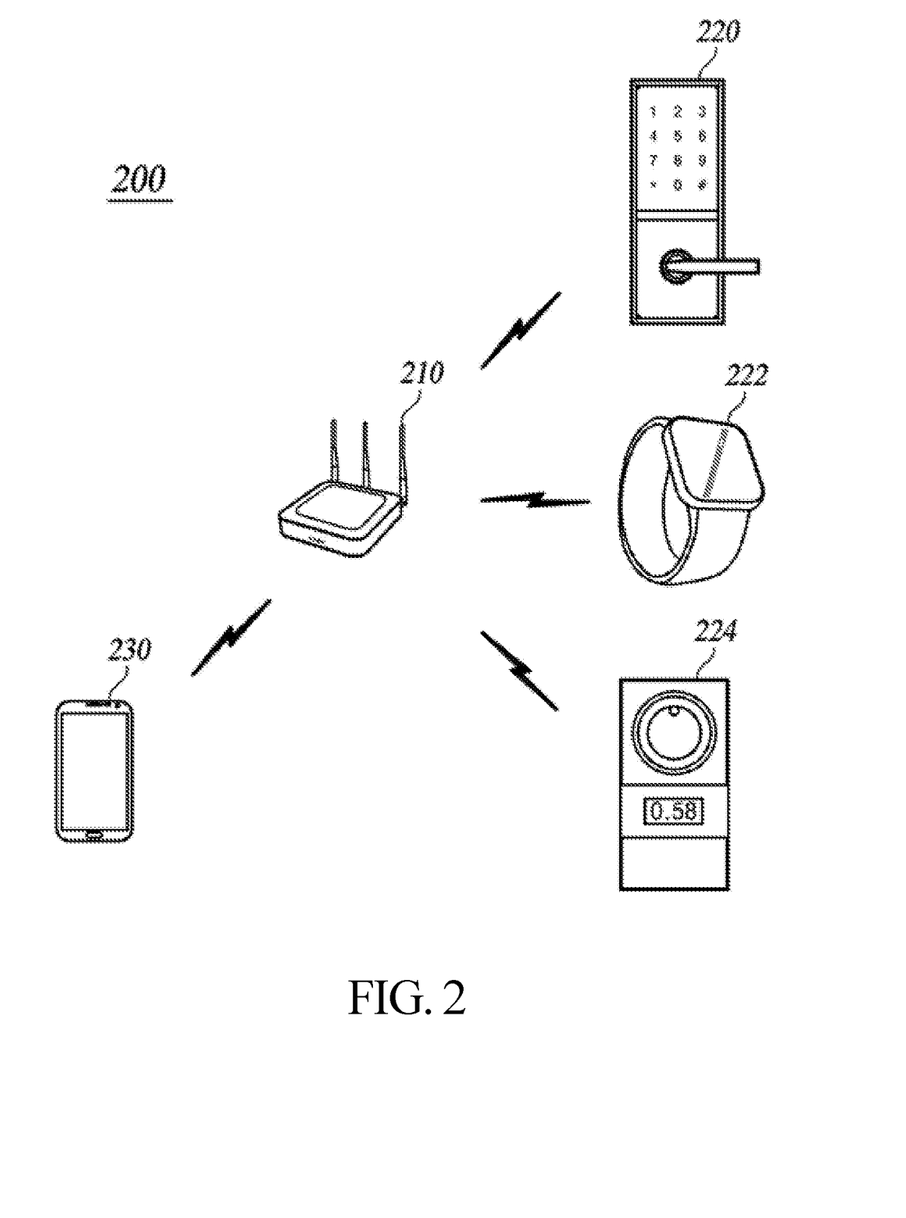
FIG. 2 illustrates an IoT system in accordance with an embodiment of the present disclosure.

FIG. 2 illustrates an IoT system 200 in accordance with an embodiment of the present disclosure.

Please refer to FIG. 2. The IoT system 200 in accordance with the embodiment of the present disclosure includes a repeater 210, IoT devices 220, 222, and 224, and a terminal 230.

The repeater 210 is a device configured to link the IoT devices 220, 222, and 224 to the terminal 230 via a wireless communication, so that data and at least one control signal are received and transmitted between the IoT devices 220, 222, and 224 and the terminal 230. The repeater 210 is configured to receive and transmit the data and the at least one control signal between the IoT devices 220, 222, and 224 and the terminal 230. The IoT devices 220, 222, and 224 and the terminal 230 try to access the repeater 210 and are connected to the repeater 210 via the wireless communication. The repeater 210 links the IoT devices 220, 222, and 224 to the terminal 230. Therefore, the IoT devices 220, 222, and 224 transmit respective state information to the terminal 230, or the terminal 230 transmits a control signal to the IoT devices 220, 222, and 224 to perform a specific operation.

The repeater 210 is a repeater having large power consumption in a communication process of the wireless communication. In a situation that the IoT devices 220, 222, and 224 or the terminal 230 tries to access to the repeater 210 via the wireless communication or maintains the connection with the repeater 210, a channel searching process for accessing, an authentication process after the channel searching process, a connecting process with a corresponding channel are performed many times. Accordingly, large power consumption is generated in the IoT devices 220, 222, and 224 or the terminal 230. That is, the repeater 210 is a repeater having large power consumption in the communication process of the wireless communication instead of a repeater which minimizes power consumption at start in a wireless communication, for example, a ZigBee wireless communication or a Z-Wave wireless communication. The repeater 210 may be implemented as various structures according to a type of a wireless network. For example, when the wireless network is WI-FI, the repeater 210 is implemented as an access point (AP). However, the repeater 210 is not limited thereto. As mentioned above, the repeater 210 may be implemented as any one device capable of linking the IoT devices 220, 222, and 224 to the terminal 230 via a wireless network, so that the IoT devices 220, 222, and 224 can use the wireless network. In the following description, the wireless network is WI-FI, and the repeater 210 is an AP.

The IoT devices 220, 222, and 224 are operated in a repeater mode under a preset condition to transmit beacons. In an initial operation condition, the IoT devices 220, 222, and 224 receive an applied initial power supply. Alternatively, when the IoT devices 220, 222, and 224 receive an applied reset signal after IoT devices 220, 222, and 224 are operated in a sleep mode, the IoT devices 220, 222, and 224 are operated in the repeater mode to transmit the beacons. However, the power consumption is increased when the IoT devices 220, 222, and 224 are operated in the repeater mode in the long term. Accordingly, the IoT devices 220, 222, and 224 are operated in the repeater mode only under a preset time. Each of the IoT devices 220, 222, and 224 notifies the terminal 230 of existence of itself by transmitting the beacons and receives a mode change signal and repeater information from the terminal 230. In a situation that each of the IoT devices 220, 222, and 224 receives the mode change signal and the repeater information from the terminal 230, each of the IoT devices 220, 222, and 224 is changed from the repeater mode to a terminal mode and tries to access to a repeater corresponding to the received repeater information.

In a situation that the IoT devices 220, 222, and 224 access to the repeater 210 and are connected to the repeater 210, the IoT devices 220, 222, and 224 refer to devices transmitting information of respective current states to the terminal 230 via the repeater 210 or receiving the control signal from the terminal 230 and being operated according to the control signal. For example, assume that the IoT device 220 is a door lock. The IoT device 220 transmits a current state of itself indicating a locked state or an unlocked state to the terminal 230 via the repeater 210. The IoT device 220 receives a locked control signal or an unlocked control signal form the terminal 230 and is operated, according to the locked control signal or the unlocked control signal, to be locked or unlocked. Herein, each of the IoT devices 220, 222, and 224 is a device assembled with a small-sized battery. Each of the IoT devices 220, 222, and 224 is different from a smart appliance assembled with a permanent power supply and different from a car assembled with a large-sized battery. As mentioned above, the IoT devices 220, 222, and 224 need large power consumption when accessing to the repeater 210 or accessing to and maintaining the connection with the repeater 210 via a wireless communication. Accordingly, the IoT devices 220, 222, and 224 assembled with the small-sized batteries are sensitive to a problem of power consumption and need to minimize the power consumption. Please refer to FIG. 5 to FIG. 8. FIG. 5 to FIG. 8 illustrate that the IoT devices 220, 222, and 224 access to the repeater 210, maintain the connections with the repeater 210, and minimize the power consumption.

The terminal 230 is linked to the IoT devices 220, 222, and 224 via the repeater 210, receives the state information of the IoT devices 220, 222, and 224, or transmits the control signal to the IoT devices 220, 222, and 224.

In a situation that the IoT devices 220, 222, and 224 receive beacons, the terminal 230 transmits the mode change signal and the repeater information to at least one of the IoT devices 220, 222, and 224. In a situation that the IoT devices 220, 222, and 224 release the beacons, the IoT devices 220, 222, and 224 function as a repeater, and the terminal 230 functions as station. In a situation that the IoT devices 220, 222, and 224 receive the beacons, the terminal 230 transmits the mode change signal to the IoT devices 220, 222, and 224, so as to change the modes of the IoT devices 220, 222, and 224 from the repeater mode to the terminal mode. In the terminal mode, the IoT devices 220, 222, and 224 function as the stations and try to access to a specific repeater to correspond to an operating mode of the specific repeater. In the situation that the IoT devices 220, 222, and 224 function as the repeaters, the terminal 230 receives, form outside, the corresponding repeater information relating to the repeater to which the terminal 230 tries to access. The terminal 230 transmits the received repeater information and the mode change signal to the IoT devices 220, 222, and 224. A specific explanation can be referred to FIG. 4 and FIG. 5.

Figure 3:
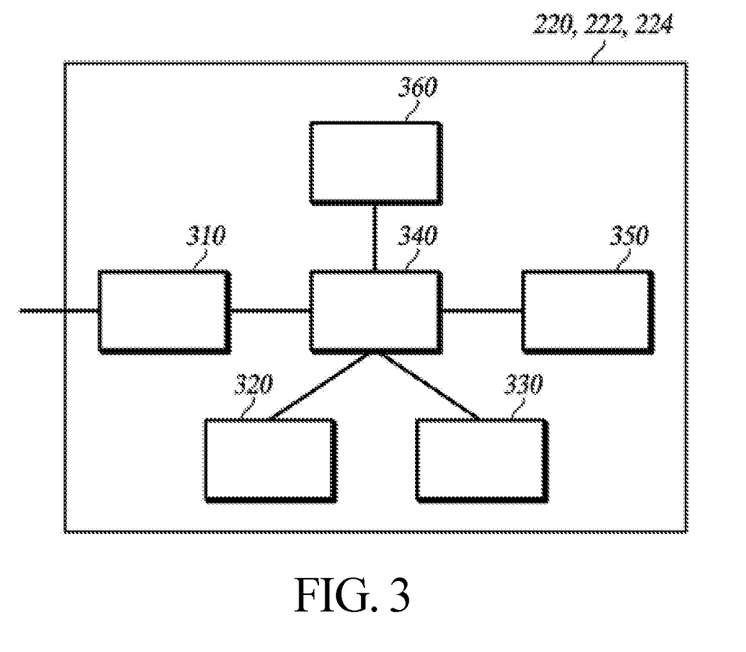
FIG. 3 illustrates a structure of an IoT device in accordance with an embodiment of the present disclosure.

FIG. 3 illustrates a structure of an IoT device in accordance with an embodiment of the present disclosure.

Please refer to FIG. 3. The IoT device 220 (222 or 224) in accordance with the embodiment of the present disclosure includes a wireless communication part 310, a power supply part 320, an input part 330, a control part 340, a storage part 350, and an operating part 360.

The wireless communication part 310 is configured to transmit beacons to outside or receives the mode change signal and the repeater information from the terminal 230. The IoT device 220 (222 or 224) is operated in the repeater mode under a preset condition. Accordingly, the wireless communication part 310 transmits the beacons to outside to produce a notification of existence of itself. In the situation that the IoT device 220 (222 or 224) receives the mode change signal and the repeater information, the wireless communication part 310 receives the mode change signal and the repeater information. Herein, the repeater information refers to required information when a repeater is accessed to, for example, a service set identifier (SSID) for identifying the repeater, an inherent password set in the repeater, or a media access control (MAC) address of the repeater.

The wireless communication part 310 is configured to transmit a signal for accessing to the repeater corresponding to the repeater information. When the wireless communication part 310 receives the mode change signal, the IoT device 220 (222 or 224) is changed from the repeater mode to the terminal mode. The IoT device 220 (222 or 224) tries to access to the repeater corresponding to the repeater information. The wireless communication part 310 is configured to transmit a signal corresponding to the repeater information, for example, a signal for searching a channel to be accessed to, an authentication signal after the channel is selected, or a signal for connecting to the corresponding channel.

The wireless communication part 310 is configured to receive an operating control signal and a determining result from the terminal 230. In practical, the wireless communication part 310 is configured to receive the operating control signal of identifying whether a connection is generated when the IoT device 220 (222 or 224) ends the accessing, or configured to receive the operating control signal of controlling the operation of the IoT device 220 (222 or 224) when the IoT device 220 (222 or 224) ends the accessing. Moreover, the wireless communication part 310 is configured to receive the determining result which is generated after the terminal 230 determines, according to the operating control signal, whether the IoT device 220 (222 or 224) is operated.

The wireless communication part 310 is configured to transmit a signal for searching whether the repeater exists. In a situation that the IoT device 220 (222 or 224) is disconnected from the repeater after the IoT device 220 (222 or 224) is connected to the repeater, the wireless communication part 310 is configured to transmit the signal for searching, under the control of the control part 340, whether the repeater exists in a preset time to outside. The signal for searching whether the repeater exists is a probe request frame.

The power supply part 320 is configured to provide power for the IoT device 220 (222 or 224). As mentioned above, the power supply part 320 refers to a detachable small-sized battery instead of a permanent power supply or a large-sized battery.

The input part 330 is configured to receive a reset signal or a wake-up signal which is inputted from outside. The input part 330 includes a part for receiving the inputted reset signal and another part for receiving the inputted wake-up signal. For example, when the IoT device 220 (222 or 224) is a door lock, the inputted reset signal is implemented in a peripheral part of the power supply part 320, and the inputted wake-up signal is implemented according to digital keys. As such, the inputted reset signal and the inputted wake-up signal are respectively received by the input part 330, and the inputted reset signal and the inputted wake-up signal are received from outside by the input part 330.

The control part 340 is configured to determine whether a preset condition is satisfied and configured to operate in the repeater mode when the preset condition is satisfied. The preset condition includes a condition that an initial power provided by the power supply part 320 is received, a condition that the power is provided after the battery of the power supply part 320 is reassembled, or a condition that the input part 330 receives the reset signal inputted from outside. When the control part 340 determines that the preset condition is satisfied, the control part 340 is configured to control the IoT device 220 (222 or 224) to be operated in the repeater mode. As such, the wireless communication part 310 releases the beacons.

However, in a condition that the control part 340 controls the wireless communication part 310 to release the beacons continuously, the power consumption is generated overly. Therefore, when the control part 340 controls the IoT device 220 (222 or 224) to be operated in the repeater mode, the control part 340 determines whether the wireless communication part 310 receives the mode change signal and the repeater information from the terminal 230 in a preset time. When the control part 340 does not receive the mode change signal and the repeater information from the terminal 230 in the preset time, the control part 340 controls the IoT device 220 (222 or 224) to be operated in a first deep sleep mode. When the terminal 230 does not exist near the IoT device 220 (222 or 224), it is possible that the repeater 210 to which the IoT device 220 (222 or 224) tries to connect does not exist, either. Under this situation, the IoT device 220 (222 or 224) releases the beacons continuously, and the power consumption is generated continuously. Accordingly, the control part 340 controls the IoT device 220 (222 or 224) to be operated in the first deep sleep mode. In the first deep sleep mode, only the input part 330 is provided with the power, and other parts including the control part 340 are not provided with the power. The first deep sleep mode is removed (released) only when the reset signal is inputted to the input part 330 or when the battery is reassembled to the power supply part 320. The first deep sleep mode is different from a sleep mode of a low power consumption IoT device in the prior art. The first deep sleep mode is not changed to the wake-up mode every regular cycle. The first deep sleep mode includes a characteristic that the first deep sleep mode cannot be waked up before the reset signal is inputted or the battery is reassembled.

Furthermore, in the situation that the wireless communication part 310 receives the mode change signal and the repeater information from the terminal 230 in the preset time, the control part 340 is changed from the repeater mode to the terminal mode and tries to access to the repeater corresponding to the repeater information. The control part 340 is changed from the repeater mode to the terminal mode, thereby preventing the wireless communication part 310 from releasing the beacons continuously and thereby trying to access to the repeater corresponding to the repeater information. The control part 340 controls the wireless communication part 310, so that the wireless communication part 310 transmits a signal corresponding to the repeater information and accessing to the repeater.

Then, the control part 340 determines whether the wireless communication part 310 is connected to the repeater. In a situation that the wireless communication part 310 is connected to the repeater, the control part 340 ends the process of accessing to the repeater. In a situation that the wireless communication part 310 is not connected to the repeater, the control part 340 scans whether the repeater corresponding to the repeater information exists and tries to access to the repeater. The control part 340 tries to scan a situation of accessing to the repeater in a preset time according to number of times. For example, the wireless communication part 310 tries to access to the repeater every two minutes within thirty minutes. In spite of this, in the situation that the wireless communication part 310 is not connected to the repeater, the control part 340 controls the IoT device 220 (222 or 224) to be operated in the first deep sleep mode.

In the situation that the wireless communication part 310 receives the operating control signal, the control part 340 controls the operating part 360 to be operated according to the operating control signal.

In the situation that the IoT device 220 (222 or 224) is disconnected from the repeater after the IoT device 220 (222 or 224) is connected to the repeater, the control part 340 searches the repeater to which the IoT device 220 (222 or 224) has been connected before. The situation that the IoT device 220 (222 or 224) is disconnected from the repeater after the IoT device 220 (222 or 224) is connected to the repeater, for example, is a situation that a power supply of the repeater is turned off or the repeater is changed to any other type. In this situation, the control part 340 searches, in the preset time, whether the repeater to which the IoT device 220 (222 or 224) has been connected before exists. The control part 340 controls the wireless communication part 310 to transmit a signal for searching whether the repeater exists to outside. The control part 340 searches, in the preset time, whether the repeater exists according to the preset number of times. In a situation that the repeater exists, the control part 340 controls the wireless communication part 310 to be connected to the repeater again. In contrast, in a situation that the repeater does not exist, the control part 340 controls the IoT device 220 (222 or 224) to be operated in a second deep sleep mode. In the second deep sleep mode, only the input part 330 and the storage part 350 are provided with the power, and other parts including the control part 340 are not provided with the power. When the wake-up signal is inputted to the input part 330, the second deep sleep mode is removed. A difference between the second deep sleep mode and the first deep sleep mode is that the second deep sleep mode is removed by the wake-up signal instead of the reset signal. Moreover, the storage part 350 is also provided with the power, so that connective information and authentication information of a communication part of any other device stored in the storage part 350 can be used. As such, additional connecting process is not required. The wireless communication part 310 can return to a communication state with the repeater.

In a situation that the IoT device 220 (222 or 224) receives the wake-up signal after the IoT device 220 (222 or 224) is operated in the second deep sleep mode, the control part 340 determines whether the repeater which the IoT device 220 (222 or 224) has been connected before is accessed to. As mentioned above, the power is also provided for the storage part 350. In the second deep sleep mode, the corresponding repeater is directly accessed to in the situation that the repeater to which the IoT device 220 (222 or 224) has been connected before exists. The control part 340 searches, in the preset time, whether the repeater exists according to the preset number of times. In a situation that the repeater is not accessed to, the control part 340 controls the IoT device 220 (222 or 224) to be operated in the first deep sleep mode because the repeater is changed. As such, the control part 340 controls the IoT device 220 (222 or 224) to be operated in the first deep sleep mode or the second deep sleep mode, thereby decreasing unnecessary or excessive searches to prevent the power consumption from being generated.

In the situation that the IoT device 220 (222 or 224) ends the accessing to the repeater according to the control of the control part 340, the storage part 350 stores the connective information and the authentication information by the continuous connectivity with the corresponding repeater. As such, in the situation that the wake-up signal is received, the wireless communication part 310 can be connected to the repeater to which has been accessed before even if the IoT device 220 (222 or 224) is operated in the second deep sleep mode.

The operating part 360 has a structure capable of being operated according to the type of the IoT device 220 (222 or 224) and according to an objective corresponding to the IoT device 220 (222 or 224). For example, when the IoT device 220 (222 or 224) is a door lock, the operating part 360 corresponds to a structure of a mobile lock head. The operating part 360 is operated according to the operating control signal under the control of the control part 340.

Figure 4:
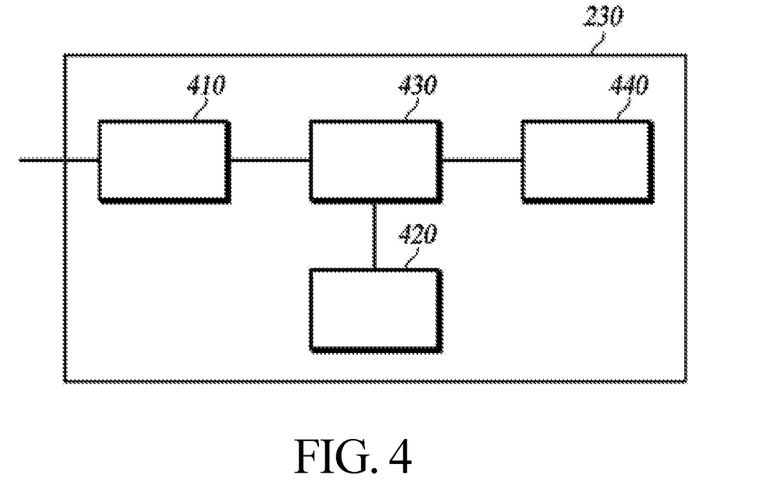
FIG. 4 illustrates a structure of the terminal in accordance with an embodiment of the present disclosure.

FIG. 4 illustrates a structure of the terminal in accordance with an embodiment of the present disclosure.

Please refer to FIG. 4. The terminal 230 in accordance with the embodiment of the present disclosure includes a wireless communication part 410, an input part 420, a control part 430, and a storage part 440.

The wireless communication part 410 is configured to receive beacons from the IoT device 220 (222 or 224). In a situation that the IoT device 220 (222 or 224) is operated in the repeater mode to release the beacons, the wireless communication part 410 receives the released beacon.

The wireless communication part 410 is configured to transmit the mode change signal and the repeater information to the IoT device 220 (222 or 224) which releases the beacons.

The wireless communication part 410 is configured to transmit the operating control signal and the determining result to the IoT device 220 (222 or 224).

The input part 420 is configured to receive, from outside, the information that the mode of the IoT device 220 (222 or 224) is changed to the terminal mode and the repeater to which the IoT device 220 (222 or 224) accesses.

The input part 420 is configured to receive, from outside, the operating control signal of determining whether the IoT device 220 (222 or 224) is connected to the repeater or the operating control signal of controlling the operation of the IoT device 220 (222 or 224) connected to the repeater. Moreover, the input part 420 is configured to receive the determining result of determining whether the IoT device 220 (222 or 224) is operated. The determining result is determined according to the operating control signal of determining whether the IoT device 220 (222 or 224) is connected to the repeater.

In the situation that the wireless communication part 410 receives the beacons, the control part 430 is configured to control the IoT device 220 (222 or 224) to change the mode of the IoT device 220 (222 or 224). The control part 430 is configured to generate the mode change signal, so that the IoT device 220 (222 or 224) is changed from the repeater mode to the terminal mode. The wireless communication part 410 is configured to transmit the mode change signal to the IoT device 220 (222 or 224). The control part 430 is configured to control the wireless communication part 410 to transmit the information of the repeater to which the IoT device 220 (222 or 224) tries to access and the mode change signal to the IoT device 220 (222 or 224).

In the situation that the input part 420 receives the operating control signal, the control part 430 is configured to control the wireless communication part 410 to transmit the operating control signal to the IoT device 220 (222 or 224). As such, a user of the terminal 230 can determine whether the IoT device 220 (222 or 224) is operated according to the operating control signal. That is, the user can determine whether the IoT device 220 (222 or 224) is connected to the repeater 210. After the user determines that the IoT device 220 (222 or 224) is connected to the repeater 210, the user inputs the determining result. The control part 430 is configured to control the wireless communication part 410 to transmit the determining result to the IoT device 220 (222 or 224).

The storage part 440 is configured to store the connective information and the authentication information, so that the terminal (230) is connected to the repeater continuously.

Figure 5:
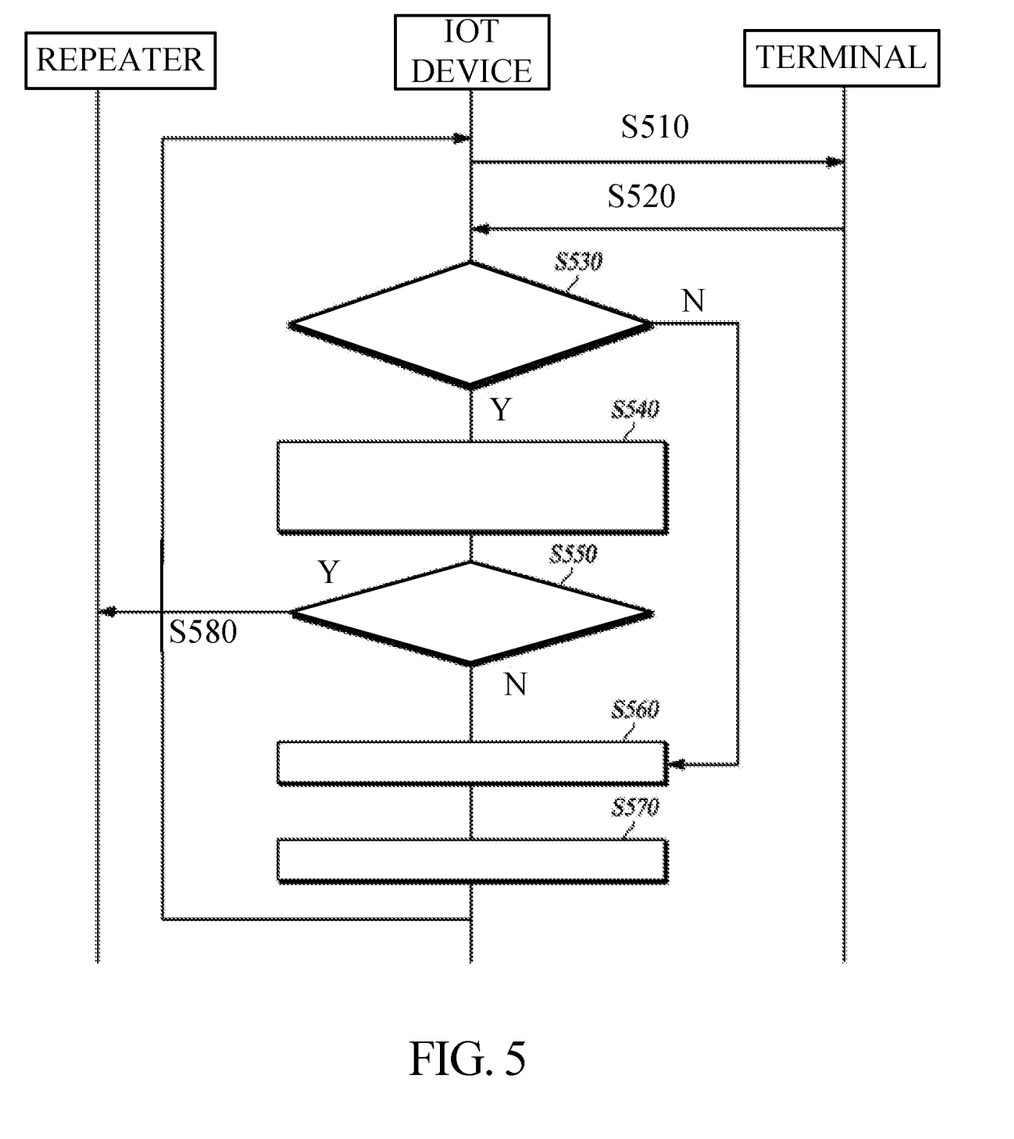
FIG. 5 illustrates that a flowchart of accessing to the repeater by the IoT device in the IoT system in accordance with an embodiment of the present disclosure.

FIG. 5 illustrates that a flowchart of accessing to the repeater by the IoT device in the IoT system in accordance with an embodiment of the present disclosure.

The IoT device 220 (222 or 224) is operated in the repeater mode to release the beacons (S510). When the IoT device 220 (222 or 224) satisfies a preset condition, the IoT device 220 (222 or 224) is operated in the repeater mode. Therefore, the IoT device 220 (222 or 224) releases the beacon to outside.

The terminal 230 transmits the mode change signal and the repeater information (S520). When the IoT device 220 (222 or 224) receives the beacons, the terminal 230 transmits the mode change signal (for changing the IoT device 220 (222 or 224) to the terminal mode) and the repeater information (including the repeater to which the IoT device 220 (222 or 224) tries to access) to the IoT device 220 (222 or 224).

It is determined whether the IoT device 220 (222 or 224) receives signals from the terminal 230 in a preset time (S530). In detail, it is determined whether the IoT device 220 (222 or 224) receives the mode change signal and the repeater information from the terminal 230 in the preset time after the IoT device 220 (222 or 224) is operated in the repeater mode to release the beacons.

When the IoT device 220 (222 or 224) receives the signals from the terminal 230 in the preset time, the IoT device 220 (222 or 224) is changed to the terminal mode according to the mode change signal and tries to access to the repeater according to the received repeater information (S540). In the preset time, when the IoT device 220 (222 or 224) receives the mode change signal and the repeater information, the IoT device 220 (222 or 224) is changed to the terminal mode according to the mode change signal. As such, the IoT device 220 (222 or 224) tries to access to the repeater corresponding to the repeater information.

It is determined whether the IoT device 220 (222 or 224) is connected to the repeater (S550).

When the IoT device 220 (222 or 224) is not connected to the repeater or does not receive the signals from the terminal 230, the IoT device 220 (222 or 224) is operated in the first deep sleep mode (S560). As mentioned above, when the IoT device 220 (222 or 224) does not receive the signals from the terminal 230 and releases the beacons continuously, the power consumption is increased. Therefore, the IoT device 220 (222 or 224) is operated in the first deep sleep mode. Furthermore, in the situation that the IoT device 220 (222 or 224) is not connected to the repeater, the IoT device 220 (222 or 224) is operated in the first deep sleep mode, and the IoT device 220 (222 or 224) scans whether the repeater corresponding to the repeater information exists and tries to access to the repeater. In the meantime, the control part 340 searches, in the preset time, whether the repeater corresponding to the repeater information exists according to the preset number of times. In spite of this, when the IoT device 220 (222 or 224) is not connected to the repeater, the IoT device 220 (222 or 224) is operated in the first deep sleep mode.

After the IoT device 220 (222 or 224) is operated in the first deep sleep mode, the IoT device 220 (222 or 224) receives the inputted reset signal (S570). When the IoT device 220 (222 or 224) receives the inputted reset signal (S570) after the IoT device 220 (222 or 224) is operated in the first deep sleep mode, step S510 is performed and the IoT device 220 (222 or 224) is operated in the repeater mode because the IoT device 220 (222 or 224) satisfies the preset condition.

In the situation that the IoT device 220 (222 or 224) is connected to the repeater, the IoT device 220 (222 or 224) ends device registration and accessing (S580).

Figure 6:
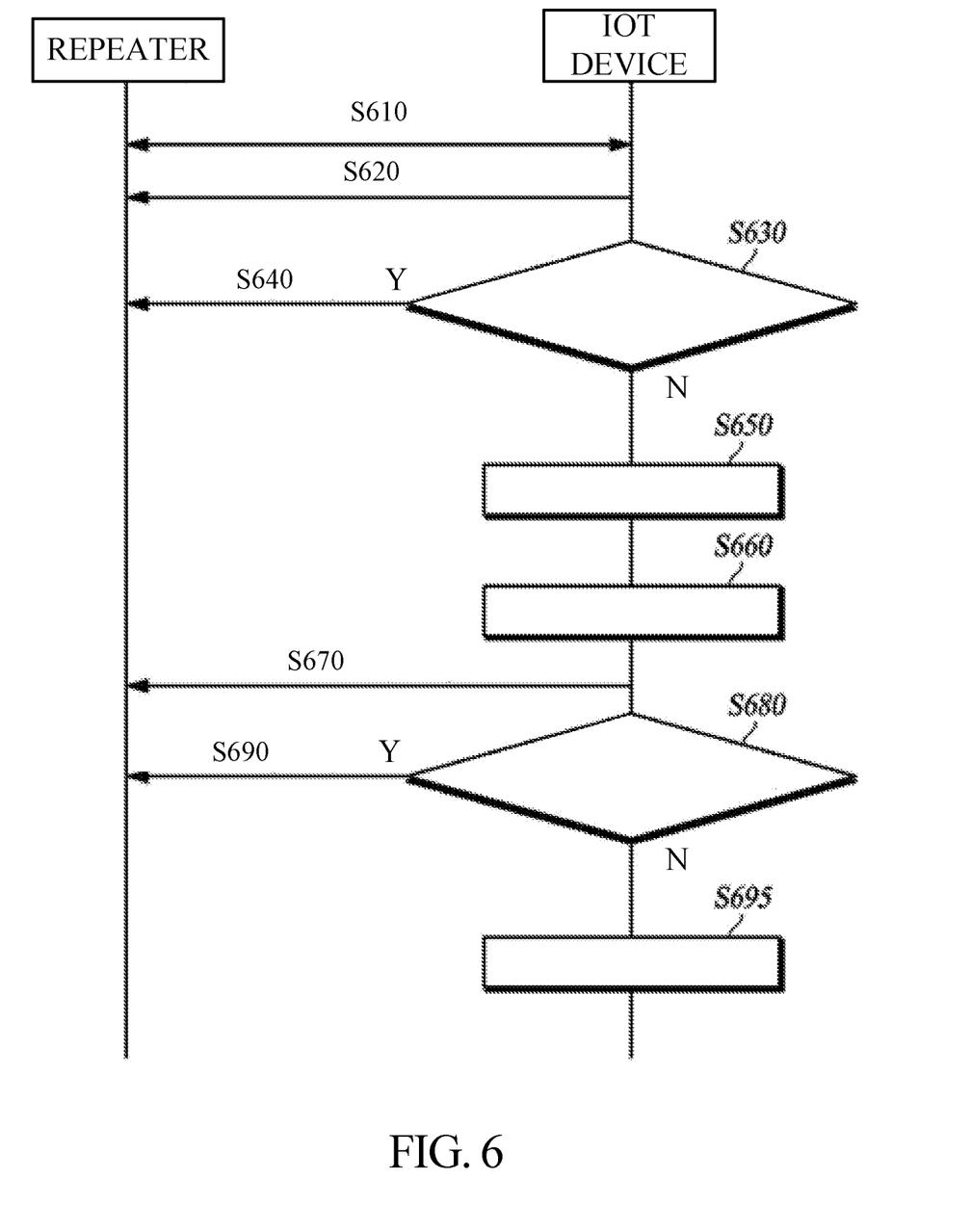
FIG. 6 illustrates that a flowchart of accessing to the repeater again by the IoT device after the IoT device is disconnected from the repeater in the IoT system in accordance with an embodiment of the present disclosure.

FIG. 6 illustrates that a flowchart of accessing to the repeater again by the IoT device after the IoT device is disconnected from the repeater in the IoT system in accordance with an embodiment of the present disclosure.

The IoT device 220 (222 or 224) is disconnected from the repeater 210 after the IoT device 220 (222 or 224) is connected to the repeater 210 (S610). The IoT device 220 (222 or 224) is disconnected from the repeater 210 by turning off the power supply of the repeater 210 or replacing the repeater 210 with another repeater.

In a situation that the IoT device 220 (222 or 224) is disconnected from the repeater 210, the IoT device 220 (222 or 224) searches the repeater 210 in a preset time (S620). The IoT device 220 (222 or 224) is controlled to search whether the repeater to which the IoT device 220 (222 or 224) has been connected before exists. At this time, the IoT device 220 (222 or 224) searches, in the preset time, whether the repeater 210 exists according to the preset number of times.

The IoT device 220 (222 or 224) determines whether the repeater 210 to which the IoT device 220 (222 or 224) is connected is searched (S630).

When the repeater 210 is not searched, the IoT device 220 (222 or 224) is operated in the second deep sleep mode (S650). When the repeater 210 is not searched, the IoT device 220 (222 or 224) is operated in the second deep sleep mode to prevent the power consumption from being generated. The difference between the second deep sleep mode and the first deep sleep mode is that the second deep sleep mode is removed by receiving the wake-up signal. Furthermore, in the second deep sleep mode, the storage part 350 is provided with the power, so that the repeater 210 can be searched in real time and the connection can be maintained.

In the situation that the IoT device 220 (222 or 224) receives the wake-up signal (S660), the IoT device 220 (222 or 224) tries to access to the repeater 210 to which the IoT device 220 (222 or 224) is connected (S670).

It is determined whether the IoT device 220 (222 or 224) accesses to the repeater 210 (S680).

In the situation that the IoT device 220 (222 or 224) does not access to the repeater 210, the IoT device 220 (222 or 224) is operated in the first deep sleep mode (S695). Although the second deep sleep mode is removed, the situation that the IoT device 220 (222 or 224) does not access to the repeater 210 corresponds to a situation that the repeater 210 to which the IoT device 220 (222 or 224) accesses is replaced by another repeater. Accordingly, the IoT device 220 (222 or 224) is operated in the first deep sleep mode (S560).

In a situation that the repeater 210 to which the IoT device 220 (222 or 224) is connected is searched or the repeater to which the IoT device 220 (222 or 224) is connected is accessed, the IoT device 220 (222 or 224) maintains the connection with the repeater 210 (S640 and S690).

Figure 7:
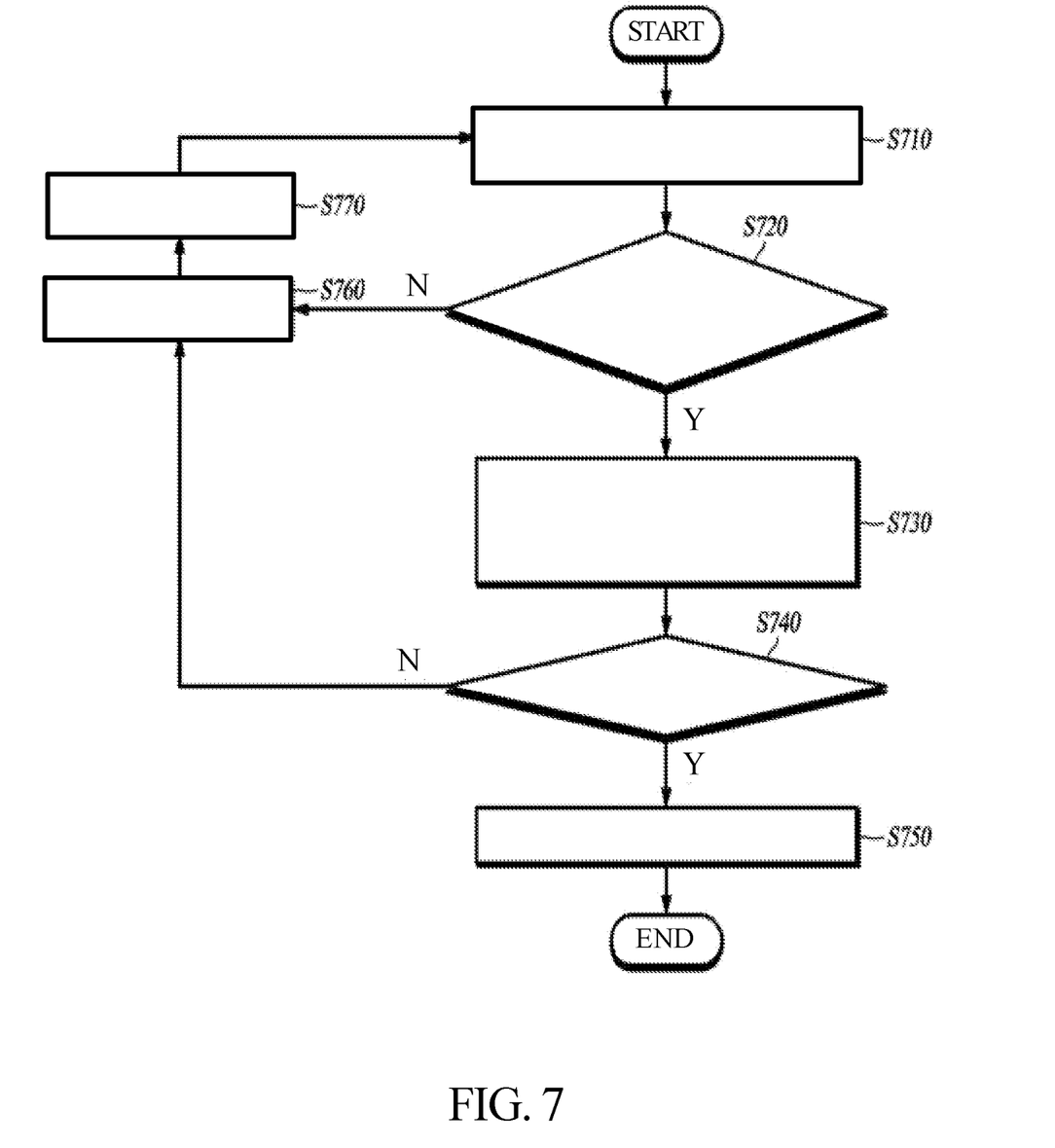
FIG. 7 illustrates that a flowchart of accessing to the repeater by the IoT device in accordance with an embodiment of the present disclosure.

FIG. 7 illustrates that a flowchart of accessing to the repeater by the IoT device in accordance with an embodiment of the present disclosure. Detailed descriptions of the steps can be referred to those of FIG. 3 to FIG. 6 and are omitted herein.

When the preset condition is satisfied, the IoT device 220 (222 or 224) is operated in the repeater mode (S710).

The IoT device 220 (222 or 224) determines whether to receive the mode change signal and the repeater information from the terminal 230 in the preset time (S720).

When the IoT device 220 (222 or 224) receives the mode change signal and the repeater information from the terminal 230 in the preset time, the IoT device 220 (222 or 224) is changed to the terminal mode according to the mode change signal and tries to access to the repeater according to the repeater information (S730).

The IoT device 220 (222 or 224) determines whether to connect to the repeater 210 (S740).

When the IoT device 220 (222 or 224) is connected to the repeater 210, the IoT device 220 (222 or 224) finishes the accessing to the repeater 210 (S750).

When the IoT device 220 (222 or 224) does not receive the mode change signal and the repeater information from the repeater 210 or is not connected to the repeater 210, the IoT device 220 (222 or 224) is operated in the first deep sleep mode (S760).

The IoT device 220 (222 or 224) receives the reset signal (S770). After the IoT device 220 (222 or 224) receives the reset signal, the IoT device 220 (222 or 224) performs step S710.

Figure 8:
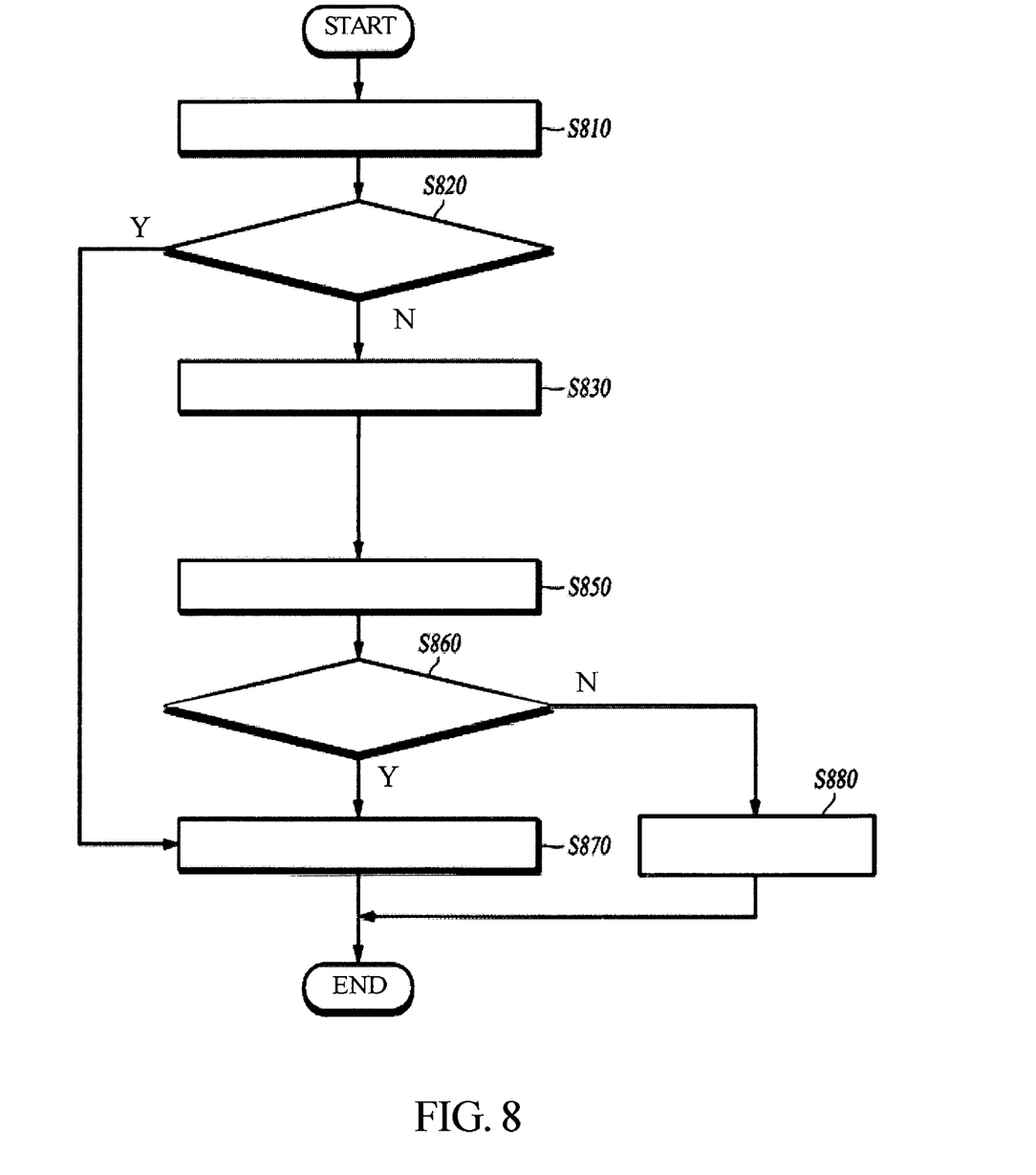
FIG. 8 illustrates that a flowchart of accessing to the repeater again by the IoT device after the IoT device is disconnected from the repeater in accordance with an embodiment of the present disclosure.

FIG. 8 illustrates that a flowchart of accessing to the repeater again by the IoT device after the IoT device is disconnected from the repeater in accordance with an embodiment of the present disclosure.

The IoT device 220 (222 or 224) searches the repeater 210 (S810).

The IoT device 220 (222 or 224) determines whether the repeater 210 is searched (S820).

When the repeater is not searched, the IoT device 220 (222 or 224) is operated in the second deep sleep mode (S830).

When the wake-up signal is received, the IoT device 220 (222 or 224) tries to access to the repeater 210 again (S850).

The IoT device 220 (222 or 224) determines whether to access to the repeater 210 successfully (S860).

When the repeater is searched or the IoT device 220 (222 or 224) accesses to the repeater successfully, the IoT device 220 (222 or 224) maintains the connection with the repeater 210 (S870).

When the IoT device 220 (222 or 224) fails to access to the repeater 210, the IoT device 220 (222 or 224) is operated in the first deep sleep mode (S880).

In FIG. 7 and FIG. 8, the processes are described and performed in sequence, but the technical ideas in accordance with the embodiments of the present disclosure are only illustrative examples. In other words, those skilled in the art of the embodiments of the present disclosure may perform, without departing the scope of the essential characteristics of the embodiments of the present disclosure, various amendments or modifications by changing the sequence of the processes described in the drawings or performing the processes in parallel. Therefore, the processes are not limited to the sequences in FIG. 7 and FIG. 8.

Furthermore, the processes in FIG. 7 and FIG. 8 are implemented by readable codes stored in a recording medium read by a computer. The recording medium capable of being read by the computer includes all types of recording devices which store data that can be read by a system of the computer. That is, the recording medium capable of being read by the computer includes a magnetic storage medium (e.g., a read only memory (ROM), a floppy, or a hard disk), an optical readable medium (e.g., a read only optical memory or a digital image disk), or a carrier (transmitted by a network). Moreover, the recording medium capable of being read by the computer may be distributed to systems of computers connected via networks and may store the codes that can be read and executed by the computers.

While the embodiments of the present disclosure have been shown and described, it will be understood the above-mentioned embodiments are merely exemplary to explain the present disclosure and not to be construed as limiting the present disclosure. Various changes, modifications, equivalents, and variants may be made by those skilled in the art from the scope of the present disclosure.

What is claimed is:

1. An IoT device having low power consumption which is directly connected to a repeater without using a gateway and wirelessly communicates with a terminal, the IoT device having low power consumption comprising:

a control part configured to operate in a repeater mode in a situation that a preset condition is satisfied, configured to operate in a terminal mode and try to access to the repeater corresponding to repeater information in a situation that a mode change signal and the repeater information are received in a preset time, and configured to operate in a sleep mode in a situation that the mode change signal and the repeater information are not received in the preset time, wherein beacons are transmitted in the repeater mode, and at least a part of the IoT device is not provided with power in the sleep mode;

a wireless communication part configured to transmit, according to control of the control part, the beacons or a signal for accessing to the repeater corresponding to the repeater information, or configured to receive the mode change signal or the repeater information from the terminal; and a power supply part configured to provide the power using a battery.

2. The IoT device having low power consumption of claim 1, further comprising:

an input part configured to receive at least one input from outside.

3. The IoT device having low power consumption of claim 2, wherein the preset condition comprises a condition that an initial power provided by the power supply part is received, a condition that the battery of the power supply part is reassembled, or a condition that the input part receives a reset signal inputted from outside.

4. The IoT device having low power consumption of claim 2, wherein in the sleep mode, only the input part is provided with the power, and the sleep mode is removed only in a situation that the input part is configured to receive a reset signal from outside or the battery is reassembled.

5. The IoT device having low power consumption of claim 1, wherein the control part determines whether to access to the repeater corresponding to the repeater information successfully, and the control part is configured to operate in the sleep mode in a situation that accessing to the repeater corresponding to the repeater information fails.

6. The IoT device having low power consumption of claim 5, wherein in the situation that the accessing to the repeater corresponding to the repeater information fails, the control part is configured to scan to determine whether the repeater corresponding to the repeater information exists and tries to access to the repeater in a preset time according to a number of times; and in a situation that it is determined that the repeater corresponding to the repeater information is not scanned, the control part is configured to operate in the sleep mode.

7. An operating method of an IoT device having low power consumption which is directly connected to a repeater without a gateway and wirelessly communicates with the terminal, the operating method of the IoT device having low power consumption comprising:

in a transmitting process, operating in a repeater mode in a situation that a preset condition is satisfied, wherein beacons are transmitted in the repeater mode;

in a determining process, determining whether a mode change signal and a repeater information are received in a preset time;

in an accessing process, operating in a terminal mode to try to access to the repeater corresponding to repeater information in a situation that the mode change signal and the repeater information are received in the preset time; and in a turning-off process, operating in a sleep mode to in a situation that the mode change signal and the repeater information are not received in the preset time, wherein in the sleep mode, at least a part of the IoT device is not provided with power.

8. The operating method of the IoT device having low power consumption of claim 7, further comprising:

in an input process, receiving at least one input from outside.

9. The operating method of the IoT device having low power consumption of claim 8, wherein the preset condition comprises:
    a condition that an initial power provided by a power supply part of the IoT device is received, a condition that a battery of the power supply part is reassembled, or a condition that a reset signal inputted from outside is received in the input process.

10. The operating method of the IoT device having low power consumption of claim 8, wherein in the input process, only the input part is provided with the power, and the sleep mode is removed only in a situation that a reset signal from outside is received or a battery of the IoT device is reassembled.

11. The operating method of the IoT device having low power consumption of claim 7, further comprising:
    in a control process, determining whether to access to the repeater corresponding to the repeater information successfully, and operating in the sleep mode in a situation that accessing to the repeater corresponding to the repeater information fails.

12. The operating method of the IoT device having low power consumption of claim 11, wherein in the control process, scanning, in the situation that the accessing to the repeater corresponding to the repeater information fails, to determine whether the repeater corresponding to the repeater information exists, and trying to access to the repeater in a preset time according to a number of times; and
    in a situation that it is determined that the repeater corresponding to the repeater information is not scanned, operating in the sleep mode.

\* \* \* \* \*